US011976730B2

(12) United States Patent
Walters et al.

(10) Patent No.: US 11,976,730 B2
(45) Date of Patent: May 7, 2024

(54) MANIFOLD INTERFACE SEAL

(71) Applicant: Mainspring Energy, Inc., Menlo Park, CA (US)

(72) Inventors: Kevin Walters, Redwood City, CA (US); Michael Buchman, South San Francisco, CA (US); Cameron Wylie, Oakland, CA (US); Kaley Boyce, Mountain View, CA (US); John Laporga, San Mateo, CA (US); David DeGraaff, Mountain View, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 137 days.

(21) Appl. No.: 17/526,453

(22) Filed: Nov. 15, 2021

(65) Prior Publication Data

US 2022/0154830 A1 May 19, 2022

Related U.S. Application Data

(60) Provisional application No. 63/113,487, filed on Nov. 13, 2020.

(51) Int. Cl.
*F16J 15/34* (2006.01)
(52) U.S. Cl.
CPC ................ *F16J 15/3436* (2013.01)
(58) Field of Classification Search
CPC ..... F16J 15/3436; F16J 15/025; F16J 15/0887
See application file for complete search history.

(56) References Cited

U.S. PATENT DOCUMENTS

| | | | | |
|---|---|---|---|---|
| 1,316,464 A | * | 9/1919 | Richter | F16J 9/14 277/497 |
| 2,590,961 A | * | 4/1952 | Green | F16J 9/14 277/494 |
| 4,953,527 A | * | 9/1990 | Coates | F01L 7/10 123/80 D |
| 4,989,558 A | * | 2/1991 | Coates | F01L 7/10 123/190.14 |
| 8,662,029 B2 | | 3/2014 | Simpson et al. | |
| 11,404,937 B2 | | 8/2022 | Svrcek et al. | |
| 2007/0170661 A1 | * | 7/2007 | Mancenido | F16J 15/08 277/600 |
| 2017/0335970 A1 | * | 11/2017 | Manry | F16J 15/442 |
| 2019/0049012 A1 | * | 2/2019 | Svrcek | F16J 15/164 |
| 2019/0063612 A1 | * | 2/2019 | Inagaki | F02M 26/70 |
| 2021/0156478 A1 | * | 5/2021 | Kimura | F16J 15/3436 |

FOREIGN PATENT DOCUMENTS

| | | | | | |
|---|---|---|---|---|---|
| EP | 0942204 A1 | * | 9/1999 | | F16J 9/16 |
| KR | 2019081929 A | * | 7/2019 | | F16J 15/186 |
| KR | 20190126615 A | * | 11/2019 | | |

* cited by examiner

*Primary Examiner* — Grant Moubry
(74) *Attorney, Agent, or Firm* — HALEY GUILIANO LLP

(57) ABSTRACT

Systems and assemblies are provided for sealing an interface between a cylinder and a manifold corresponding to the cylinder. The cylinder comprises at least one port. A manifold interface is arranged adjacent to the at least one port. A seal is located inside of a circumferential pocket, wherein the circumferential pocket comprises at least a portion of the manifold interface. A spring is configured to preload the seal radially inward so that the seal stays in contact with the outer surface of the cylinder.

20 Claims, 13 Drawing Sheets

600A

600B

600C

MANIFOLD INTERFACE SEAL

CROSS-REFERENCE TO RELATED APPLICATIONS

This application claims the benefit of U.S. Provisional Patent Application No. 63/113,487 filed Nov. 13, 2020, the disclosure of which is hereby incorporated by reference herein in its entirety.

INTRODUCTION

The present disclosure is directed to sealing between a manifold and a port, and more particularly, to a seal system that allows relative motion between a manifold and a port.

SUMMARY

The present disclosure is directed to an assembly for sealing between a cylinder of a linear generator and a manifold (e.g., an exhaust manifold) corresponding to the cylinder of the linear generator. In some embodiments, the cylinder has at least one port. A manifold interface is arranged adjacent to the at least one port. A seal is positioned within a circumferential pocket corresponding to the manifold interface. Additionally, a spring element is configured to preload the seal radially inward so that the seal stays in contact with the outer surface of the cylinder.

In some embodiments, the sealing assembly comprises a housing defining a circumferential recess, a seal arranged in the circumferential recess, and a spring element arranged within the circumferential recess, radially outward of the seal providing a radially inward force on the seal. In some embodiments, the sealing assembly is configured to interface with a manifold. In some embodiments, a contact surface between the sealing assembly and the manifold is a gapped interface. In some embodiments, the housing is affixed to a member, wherein the member interfaces with a manifold.

In some embodiments, the seal comprises a graphite material. In some embodiments, the seal comprises at least one respective tab on each respective end of the seal, wherein each of the at least one respective tabs comprises a fillet radius configured to accommodate complementary tabs from an opposing end of the seal. In some embodiments, the seal comprises a pair of sealing elements, wherein each of the pair of sealing elements interface with each other via the at least one respective tab when arranged within the circumferential recess.

In some embodiments, the assembly comprises a manifold assembly. The manifold assembly comprises a manifold configured to receive exhaust from a cylinder port, and a sealing assembly. The sealing assembly comprises a housing defining a circumferential recess, a seal arranged in the circumferential recess, and a spring element arranged within the circumferential recess, radially outward of the seal providing a radially inward force on the seal. The sealing assembly seals an interface between the manifold and the cylinder port. In some embodiments, the interface is further arranged around an outer surface of the cylinder.

In some embodiments, the sealing assembly is configured to translate radially and independent of the interface. In some embodiments, the sealing assembly comprises at least one sealing ring element. In some embodiments, the interface further comprises a retaining ring. In some embodiments, the at least one sealing ring element is arranged such that an outer surface of the at least one sealing ring element abuts an inner surface of the retaining ring.

In some embodiments, the at least one sealing ring element comprises at least two sealing ring elements fixedly attached to at least one tension band, wherein the at least one tension band is arranged to prevent radial gaps from forming between the at least two sealing ring elements. In some embodiments, at least one end of the at least one tension band is fixedly attached to the spring element.

In some embodiments, the manifold interface further comprises a retaining ring and wherein an outer surface of the at least two sealing ring elements abuts an inner surface of the retaining ring. In some embodiments, the spring element is accommodated by a portion of the at least two sealing ring elements.

In some embodiments, the system comprises a linear generator ("LGEN"). The LGEN may comprise a linear electromagnetic machine ("LEM"). In some embodiments, the LGEN comprises a cylinder configured to propagate an exhaust producing reaction, wherein the cylinder comprises at least one cylinder port, a manifold assembly, wherein the manifold assembly is configured to interface with the at least one cylinder port. The manifold assembly comprises a manifold configured to receive exhaust from the at least one cylinder port, and a sealing assembly. The sealing assembly comprises a housing defining a circumferential recess, a seal arranged in the circumferential recess, and a spring element arranged within the circumferential recess, radially outward of the seal providing a radially inward force on the seal. In some embodiments, the sealing assembly seals an interface between the manifold and the at least one cylinder port.

In some embodiments, a method of installing a seal assembly for sealing between a cylinder and a manifold assembly comprises arranging the cylinder and the manifold assembly relative to each other, axially arranging the seal assembly relative to the cylinder and relative to the manifold, and affixing the seal assembly to the manifold assembly.

In some embodiments, the method further comprises arranging a tool relative to the cylinder to position the seal assembly and removing the tool from the seal assembly after affixing the seal assembly.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to manifold interface seals. For example, an exhaust system, and in particular the manifold, may be mechanically isolated from the power cylinder statically so that the power cylinder may deform relatively unrestricted when it undergoes thermal strain. Likewise, it may be dynamically isolated so that it remains relatively unaffected by the vibrations inherent in the exhaust system and power cylinder.

To illustrate, the exhaust from a power cylinder of a linear generator travels out of the cylinder through exhaust ports in the power cylinder, through a manifold, and through an exhaust pipe system that directs the exhaust gasses into the ambient air. The exhaust system may have one or more sections for noise control such as Helmholtz resonators, as well as gas treatment apparatus' such as catalytic converters. As such, the exhaust system may be extensive, and it may be constructed of thin-walled metal tubes, panels, and shrouds that may be welded and or bolted together. Thus, the exhaust system, including the manifold, may be relatively flexible, causing it to exhibit vibration due to the exhaust gas flow, structural vibrations, and acoustic vibrations originating from within or outside of the exhaust system.

A power cylinder may include an elongate, tubular shape that operates at high temperatures and requires tight dimensional tolerances to remain aligned and true. Conventional metal seals or pack seals typically lack flexibility so that they tend to transmit structural forces caused by vibration or thermal strain between a manifold and a power cylinder. It is desired to provide a manifold seal that does not significantly transmit structural forces.

Figure 1:
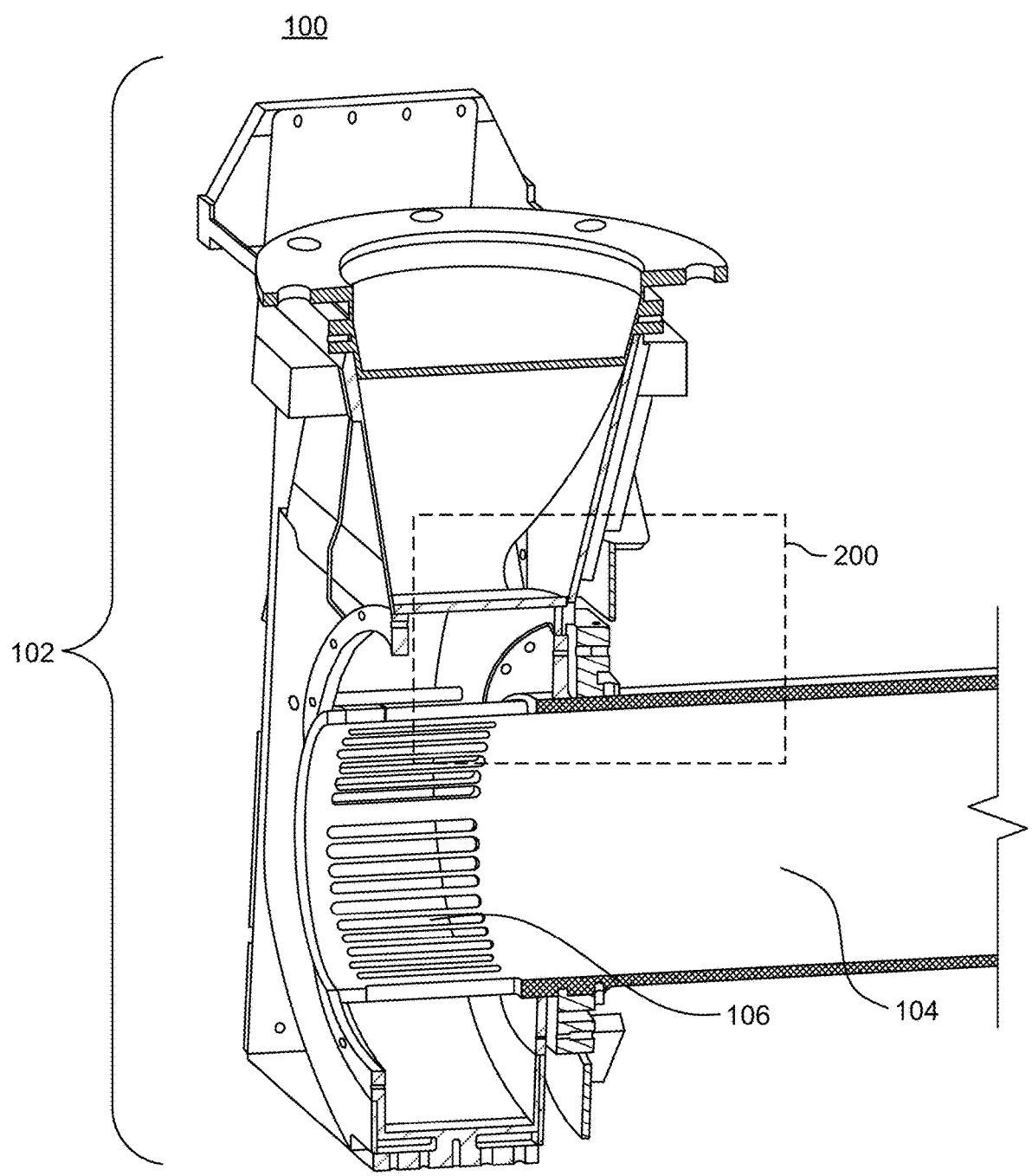
FIG. 1 is a cross-sectional view through a subassembly of a linear generator showing a connection between an exemplary power cylinder and an exemplary manifold assembly, in accordance with some embodiments of the present disclosure.

FIG. 1 is a cross-sectional view through subassembly 100 of a linear generator showing the connection between cylinder 104 and manifold assembly 102. Exhaust gases are expelled from cylinder 104 before they pass through exhaust ports 106 and into manifold assembly 102 before they flow through the exhaust system (not shown).

Figure 2:
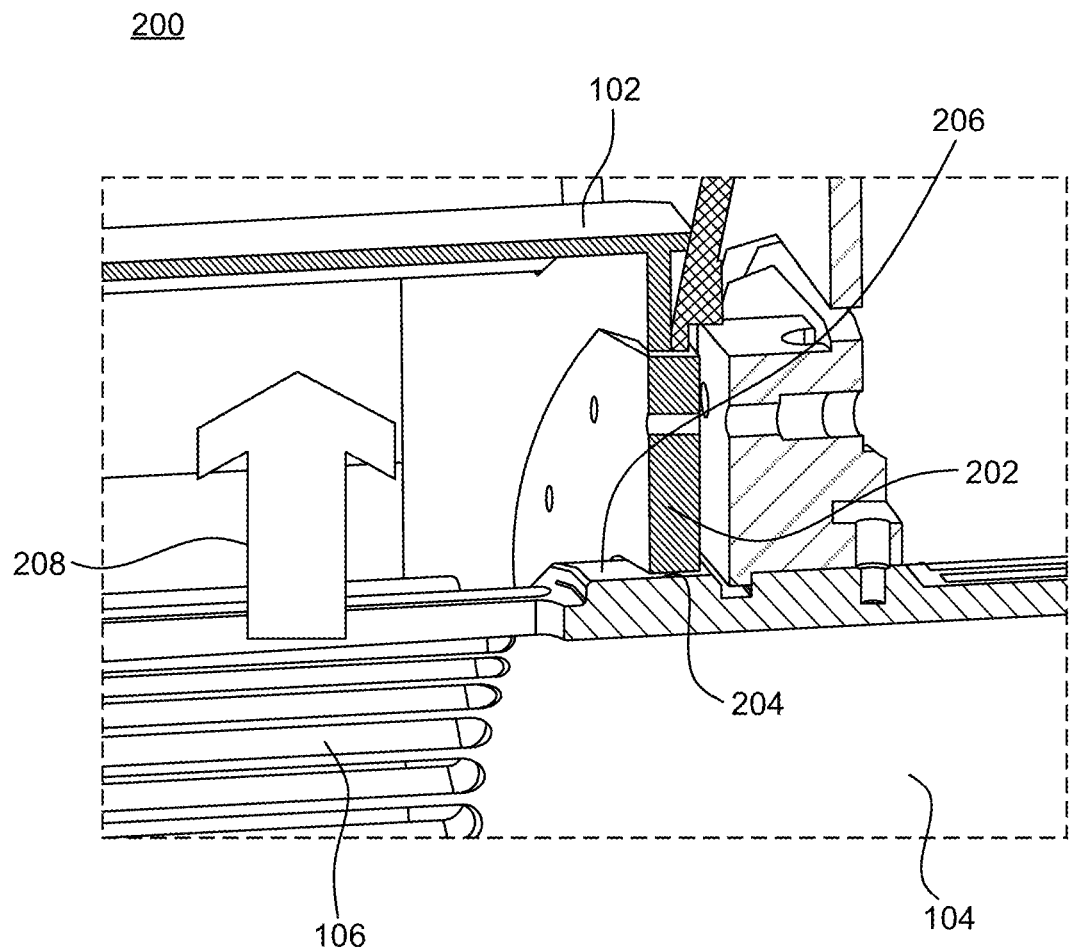
FIG. 2 depicts a detailed portion of FIG. 1 illustrating the region where the power cylinder interfaces with the manifold assembly, in accordance with some embodiments of the present disclosure.

FIG. 2 shows detailed portion 200 taken from FIG. 1 illustrating a region where cylinder 104 interfaces with manifold assembly 102. Manifold assembly 102 interfaces with cylinder 104 at outer surface 206 of cylinder 104 and beside exhaust ports 106 such that exhaust 208 flows out of exhaust ports 106 and into manifold assembly 102. Manifold assembly 102 has an inboard flange 202 that closely encircles cylinder 104 but does not make contact with cylinder 104. Flange 202 may be an integral part of manifold assembly 102 or it may be a discrete component that is attached to manifold assembly 102 by any suitable attachment method such as bolting, welding, or riveting.

Since manifold assembly 102 and cylinder 104 generally have different structural characteristics (static and dynamic stiffness) and different thermal and structural loads, they may need to be mechanically uncoupled so that they are vibrationally isolated and isolated from thermal expansion effects. This isolation allows cylinder 104 to remain aligned and true to meet the tight tolerances required for efficient operation and permissible ring wear rates during its lifecycle. To accomplish uncoupling or isolation, manifold assembly 102 and cylinder 104 may be mounted independently to different structural chassis' (frames) or mounted to the same chassis (frame) in different locations to allow some relative movement between them at the area where they interface, for example, at flange 202. As a result, manifold assembly 102 and cylinder 104 may not be in direct contact; that is, there is a gap 204 between outer surface 206 of cylinder 104 and the manifold 102.

The gap 204 may be sized to allow cylinder 104 to expand freely in the radial and axial directions due to thermal expansion without being constrained, allowing cylinder 104 to remain aligned, straight, and true. For example, a power cylinder with an outer diameter of about 200 mm may have a gap 204 that is approximately 1.5 mm when the system is at room temperature, but it may be 1 mm when the system is at operating temperature (e.g., 700 C) due to thermal expansion of the power cylinder. In some embodiments, a smaller cylinder may expand less than previously described, thereby enabling the implementation of tighter tolerances. Tighter tolerances in the gap 204 are generally desirable to provide a more restrictive flow path for gas leakage. For example, a power cylinder with a 100 mm outer diameter may have a gap of about 1 mm cold and 0.5 mm when at operating temperature. In general, the gap between the power cylinder and any manifold interface is a function of the tolerances that can be achieved at the joint and the amount of relative displacement at the interface caused by vibration and thermal strain. Notably, the embodiment shown in FIGS. 1 and 2 lacks a seal between cylinder 104 and inboard flange 202 so that the gap 204 provides a leak path from manifold assembly 102.

Figure 3:
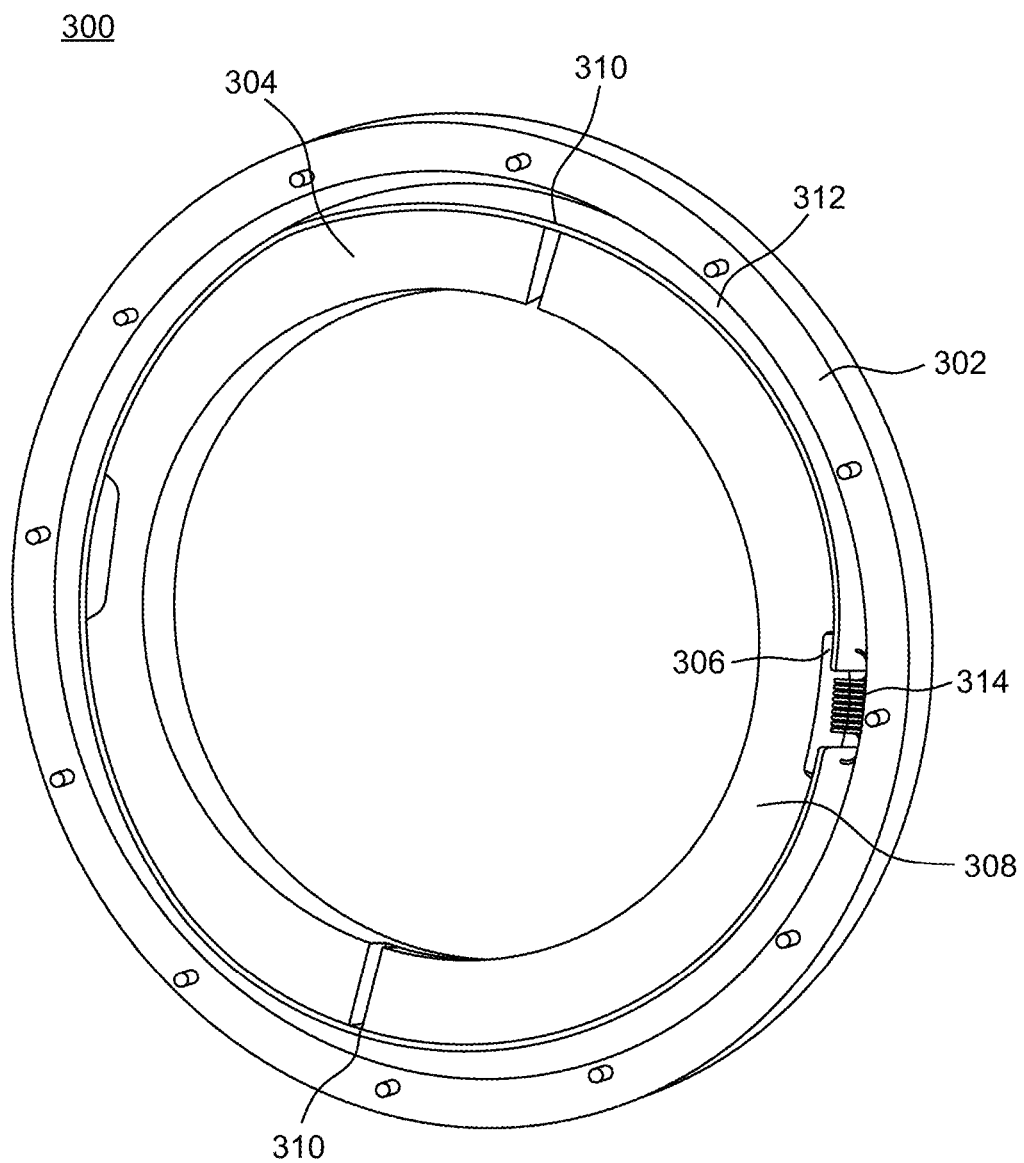
FIG. 3 shows a seal assembly for sealing between one or more structures including a manifold and a power cylinder, in accordance with some embodiments of the present disclosure.

FIG. 3 shows a seal assembly 300 for sealing between one or more structures such as the aforementioned manifold and power cylinder. The seal assembly may comprise retaining ring 302 (e.g., a seal assembly housing) and first sealing ring 304 and second sealing ring 308 are slidably engaged at their ends as described further below. Sealing rings 304 and 308 may be biased with an inward radial force to keep them in contact with the power cylinder as sealing rings 304 and 308 wear or as the power cylinder expands or contracts due to thermal strain.

In some embodiments, the seal assembly may include a tension band 312 around the outer periphery of sealing rings 304 and 308 to bias them radially inward. Tension band 312 may be shorter in length than the circumference of sealing rings 304 and 308 so that a tension spring 314 can be connected between the ends of the band 312 to provide a circumferential (azimuthal) force that preloads sealing rings 304 and 308 radially inward. Tension band 312 may be made of a thin strip of metal that is relatively stiff and essentially inextensible under tension while having negligible bending stiffness so that it acts predominantly in tension. The tension is controlled by the tension spring 314, such that a stiffer tension spring 314 increases the force that sealing rings exert on the cylinder. Tension band 312 may also seal against any radial gaps 310 formed at the interface between sealing rings 304 and 308, as shown in FIG. 3. The tension spring 314 may be made of any spring material capable of holding tension for an extended period, such as metals, for example stainless steel or spring steel.

One skilled in the art would recognize that there are many devices that can provide an inward radial force to the ring segment assembly, such as having an elastic band, radial springs, cantilever springs, or wave spring disposed at the outer radius of sealing rings. These and other approaches are within the scope of this disclosure. Likewise, there are other types of springs that may be applied to a tension band to provide tension. In some embodiments, the tension spring 314 may be a coil spring, as shown in FIG. 3. As such, sealing ring 308 adjacent to tension spring 314 may have recess 306 to accommodate tension spring 314 so that it is low in profile for packaging and so that it transmits a force that is in line with tension band 312.

Figure 4A:
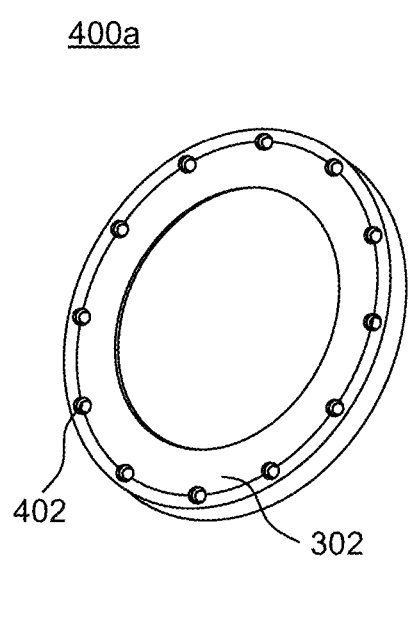
FIGS. 4A and 4B show a retaining ring with an array of holes for attaching to an inboard flange of a manifold assembly while capturing at least one seal, in accordance with some embodiments of the present disclosure.
Figure 4B:
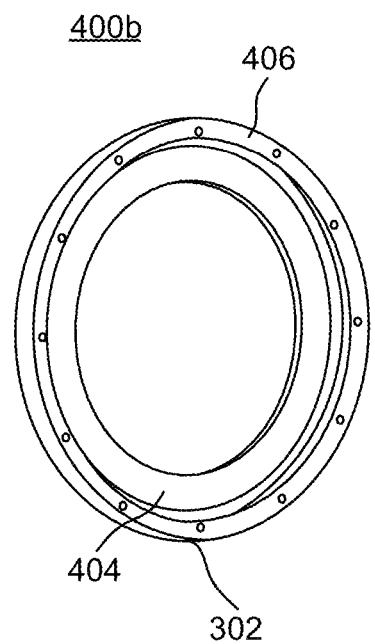
Figure 10:
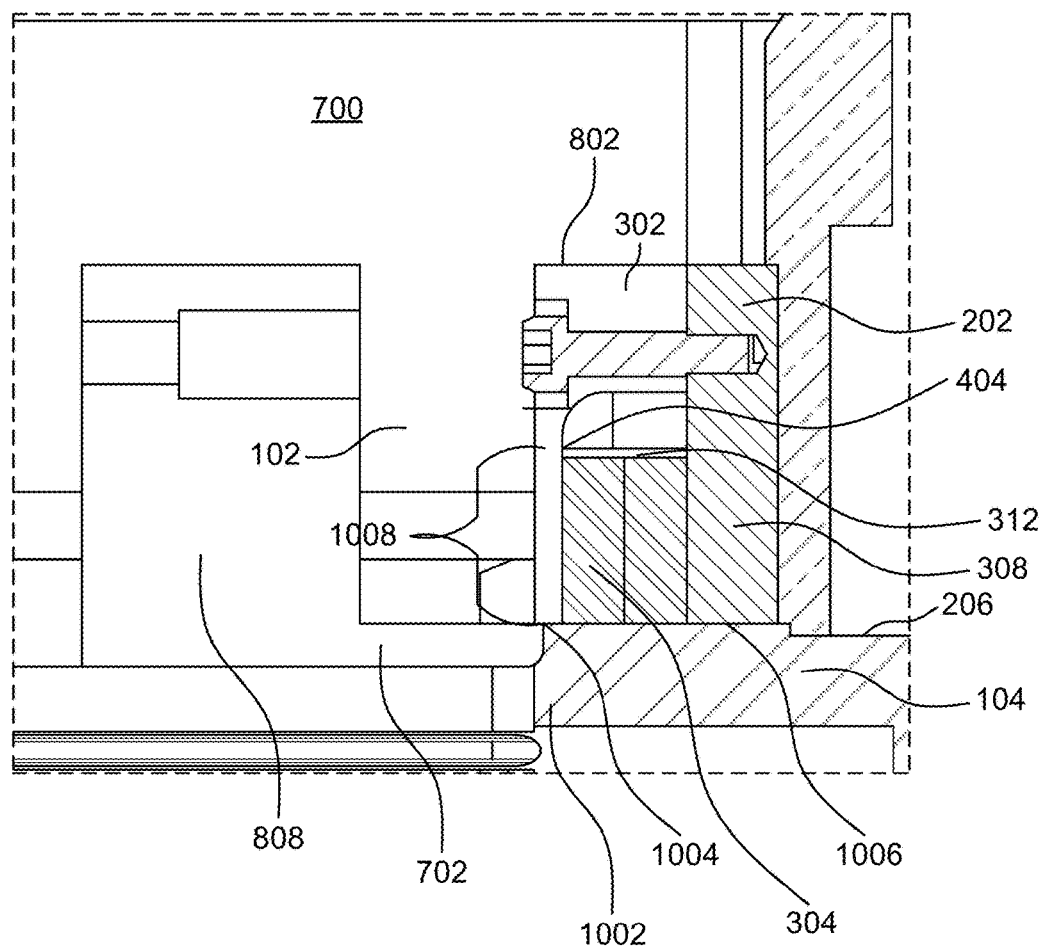
FIG. 10 is a detailed view of a portion of FIG. 9 corresponding to an exemplary seal assembly mounted into place, in accordance with some embodiments of the present disclosure.

FIGS. 4A and 4B show respective views 400A and 400B of retaining ring 302 with an array of holes 402 for attaching to inboard flange 202 of manifold assembly 102 to capture the seals. View 400A shows the backside of retaining ring 302 where bolts can be placed through the holes for installation of the seal assembly. View 400B shows the inside of retaining ring 302 having a ring pocket 404 that houses sealing rings 304 and 308. The depth of ring pocket 404 relative to the retaining ring flange 406 may have tight manufacturing tolerances to minimize leaking around the rings. For example, the ring pocket may have a depth tolerance of +0.05 mm/−0.00 mm so that sealing rings 304 and 308 have some clearance with respect to the pocket 404 to allow them to remain in contact with the power cylinder as it deforms radially and translates axially relative to flange 406 and the manifold. Since the retaining ring flange 406 mounts flush to inboard flange 202 (e.g., as shown in FIG. 10) of manifold assembly 102, the depth of ring pocket 404 dictates the amount of axial clamping force (or lack thereof) on sealing rings 304 and 308. The retaining ring may be made of a material capable of withstanding exhaust gas temperatures, which may be approximately 300 C, or from 200 C to 800 C for example. Candidate retaining ring materials include, for example, metals such as stainless steel, which may be plated for corrosion resistance.

Figure 5:
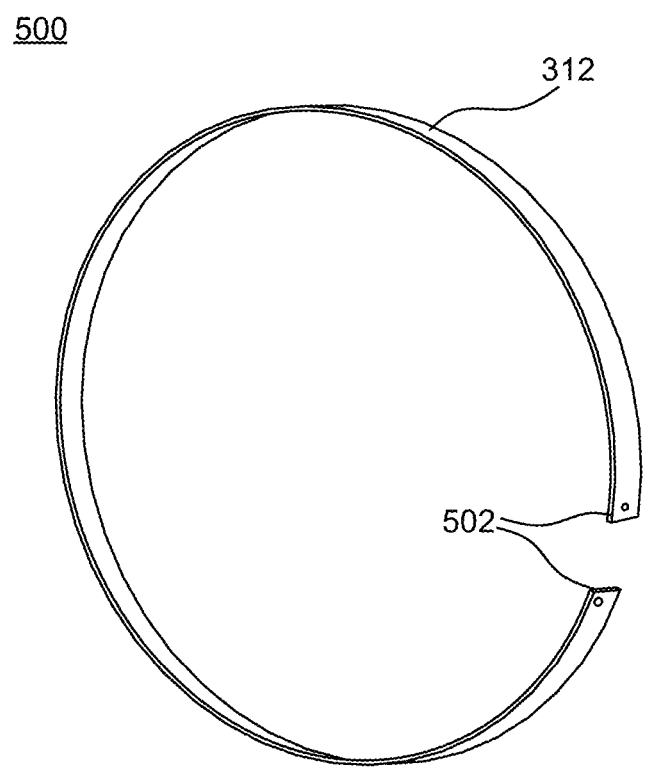
FIG. 5 depicts an exemplary tension band, in accordance with some embodiments of the present disclosure.

FIG. 5 shows tension band 312, which may have holes 502 near the terminus of band 312 to connect tension spring 314 (e.g., as shown in FIG. 3). Tension band 312 may be made of any suitable material capable of wrapping around the circumference of the sealing rings and holding tension, (e.g., metals such as stainless steel).

Figure 6A:
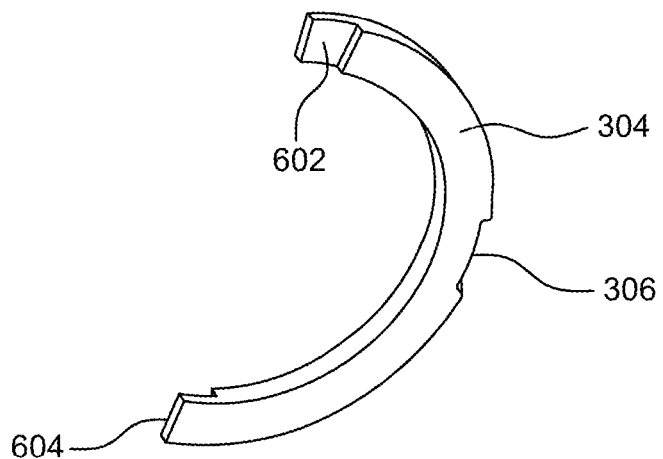
FIGS. 6A-6C depicts illustrative sealing rings, in accordance with some embodiments of the present disclosure.
Figure 6B:
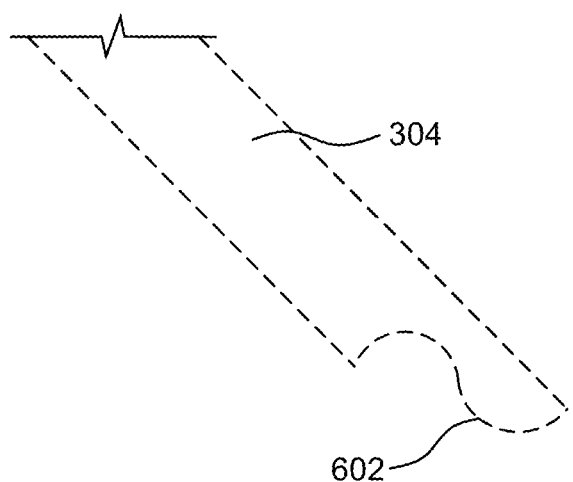
Figure 6C:
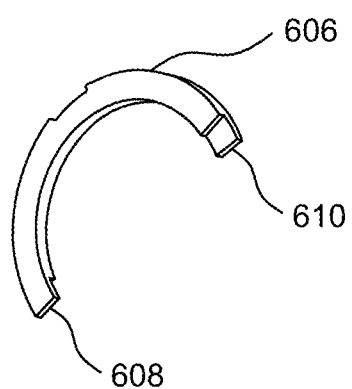

Now with reference to FIGS. 6A-6C, which illustrate embodiments of a sealing ring. Sealing ring 304 may wear at its inner radial surface, causing its ends to move circumferentially. To accommodate the end displacement, the sealing rings may have recessed tabs on each end that overlap with the opposing ring to allow the rings to translate azimuthally without developing an axial leak path. For example, the first sealing ring 304 of FIG. 6A has a first tab 602 and a second tab 604 at the opposite end. These tabs 602 and 604 overlap with the similar tabs on the second sealing ring 308, as shown in FIG. 3. The tabs 602 and 604 may be between approximately 10-25 mm in length in some embodiments. To reduce stress around the transition to the thinner section, each tab 602 and 604 may have a fillet radius at the base where it transitions to the nominal thickness of sealing ring 304 as well as at the tip of the tab 602 as shown in FIG. 6B. In some embodiments, these fillet radii may be rounded about the entire profile.

The tabs 602 and 604 may be recessed on opposite axial sides of the ring 304, as shown in FIG. 6A or they may be on the same side of the ring for ease of manufacturing, as shown in FIG. 6C; sealing ring 606 has a first tab 608 and a second tab 610 located on the same axial face.

The sealing rings may be comprised of any material capable of withstanding the vibration and thermal environment that arises at the junction between the power cylinder and manifold. For example, the seal may be of pure graphite or a mixture containing graphite, or other seal materials such as polymers or elastomers. In some embodiments, a high-strength graphite-based material may be used having a high toughness such that it can withstand a mechanical strain of 0.6% or more.

Figure 7:
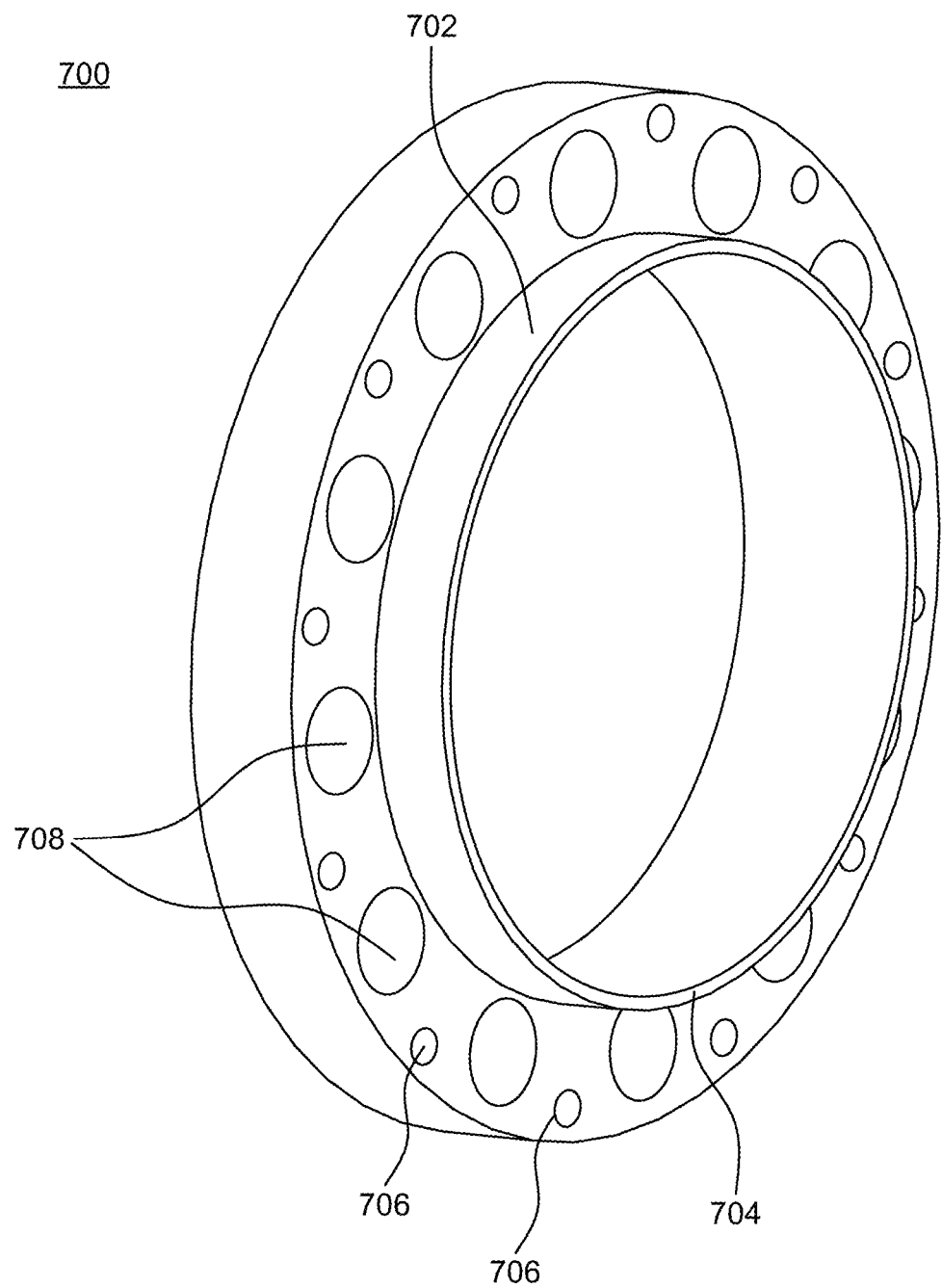
FIG. 7 shows an illustrative installation tool used to pilot a sealing ring assembly onto a power cylinder, in accordance with some embodiments of the present disclosure.

The ring assembly fits over the cylinder with tight tolerances, and it is installed through a deep cavity (the manifold) to where it resides on the power cylinder. Therefore, a tool may be used to aid in installing the sealing ring assembly. FIG. 7 shows an embodiment of installation tool 700 used to pilot the sealing ring assembly onto the power cylinder. Installation tool 700, as illustrated, includes two different arrays of holes. A first array of holes may be fastener pilot holes 706 for holding bolts. A second array of holes may be large holes 708 for pushing the sealing ring assembly off the tool 700 and onto a power cylinder. Installation tool 700 has cylindrical flange 704 that holds the seal assembly and serves as a surrogate cylinder surface until the seal assembly is pushed off the tool and into place on the power cylinder (e.g., for lateral alignment during installation). Leading edge 704 of radial flange 702 may contact a lip on a power cylinder to stop installation tool 700 at an axial location so that the seal assembly can be unloaded into an installation position.

Figure 8:
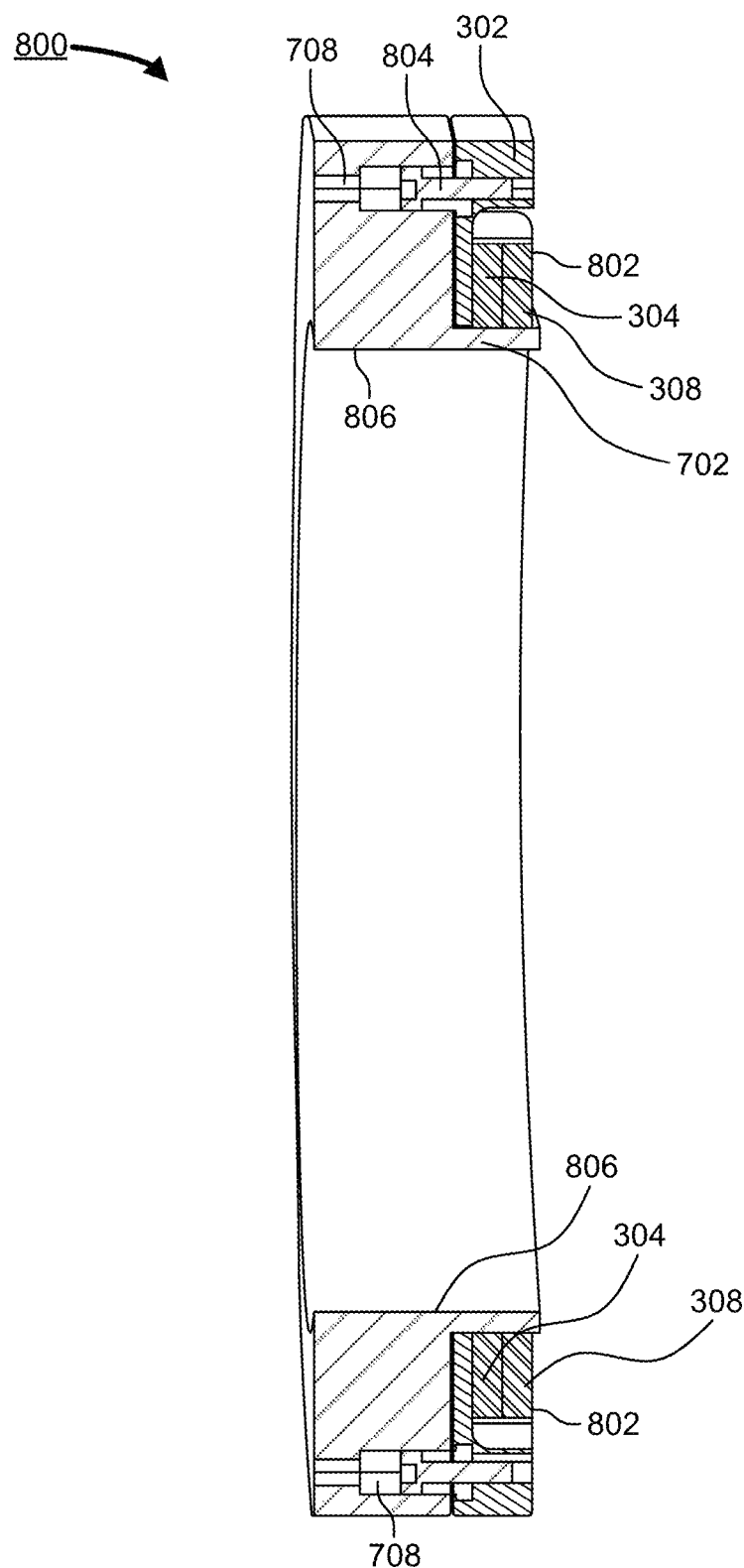
FIG. 8 is a cross-sectional view showing an exemplary seal assembly in place on an exemplary installation tool, in accordance with some embodiments of the present disclosure.

FIG. 8 is a cross-sectional view showing seal assembly 802 in place on installation assembly 800. Installation assembly 800 corresponds to installation tool 700 of FIG. 7. The fasteners 804 are held in the installation tool 700 through the pilot holes 706. Fasteners 804 may protrude into retaining ring 302 to keep it clocked at the right angle so that they are already aligned. The first and second sealing rings 304 and 308 reside on flange 702 of installation tool 700. Inner radial surface 806 of installation tool 700 is sized to pilot over outer surface 206 of cylinder 104. Seal assembly 802 comprises sealing ring 304 and sealing ring 308 that are slidably engaged at their respective ends. Sealing rings 304 and 308 may be biased with an inward radial force to keep them in contact with cylinder 104 as sealing rings 304 and 308 wear or as cylinder 104 expands or contracts due to thermal strain.

In some embodiments, the seal assembly may include a tension band (e.g., tension band 312 of FIG. 3) around the outer periphery of sealing rings 304 and 308 to bias them radially inward and it may be installed between retaining ring 302 and sealing rings 304 and 308. The tension band may be shorter in length than the circumference of sealing rings 304 and 308 so that a tension spring (e.g., tension spring 314 of FIG. 3) can be connected between the ends of the tension band to provide a circumferential (azimuthal) force that preloads sealing rings 304 and 308 radially inward. The tension band may be made of a thin strip of metal that is relatively stiff and essentially inextensible under tension while having negligible bending stiffness so that it acts predominantly in tension. The tension is controlled by the tension spring, such that a stiffer tension spring increases the force that the sealing rings exert on the cylinder. The tension band also seals against any radial gaps formed at the interface between sealing rings 304 and 308, as shown in FIG. 3.

In addition to a metal strip, there are other devices that can provide an inward radial force to the ring segment assembly, such as an elastic band, radial springs, cantilever springs, or a wave spring disposed at the outer radius of the sealing rings. These and other approaches are within the scope of this disclosure. Likewise, there are other types of springs that may be applied to a tension band to provide tension. In some embodiments, the tension spring 314 may be a coil spring, as shown in FIG. 3. As such, sealing ring 308 adjacent to tension spring 314 may have recess 306 to accommodate tension spring 314 so that it is low in profile for packaging and so that it transmits a force that is in line with tension band 312.

Installation assembly 800 is used to pilot sealing ring assembly 802 onto a power cylinder (e.g., cylinder 104). Sealing ring assembly 802 slidably fits over the cylinder, and it may need to be installed through a deep cavity (the manifold) to where it resides on the power cylinder. Therefore, a tool may be used to aid in installing the sealing ring assembly. Installation tool 800 includes at least large holes 708 for pushing the sealing ring assembly off installation tool 800 and onto a power cylinder (e.g., cylinder 104). Installation tool 800 has flange 702 that holds the sealing ring assembly 802 and serves as a surrogate cylinder surface until the seal assembly is pushed off of the tool and into place on the power cylinder (e.g., for lateral alignment during installation). A leading edge of radial flange 702 (e.g., edge 704 of FIG. 7) may contact a lip (or step) on a power cylinder to stop installation tool 800 at an axial location so that the seal assembly can be unloaded into an installation position.

Figure 9:
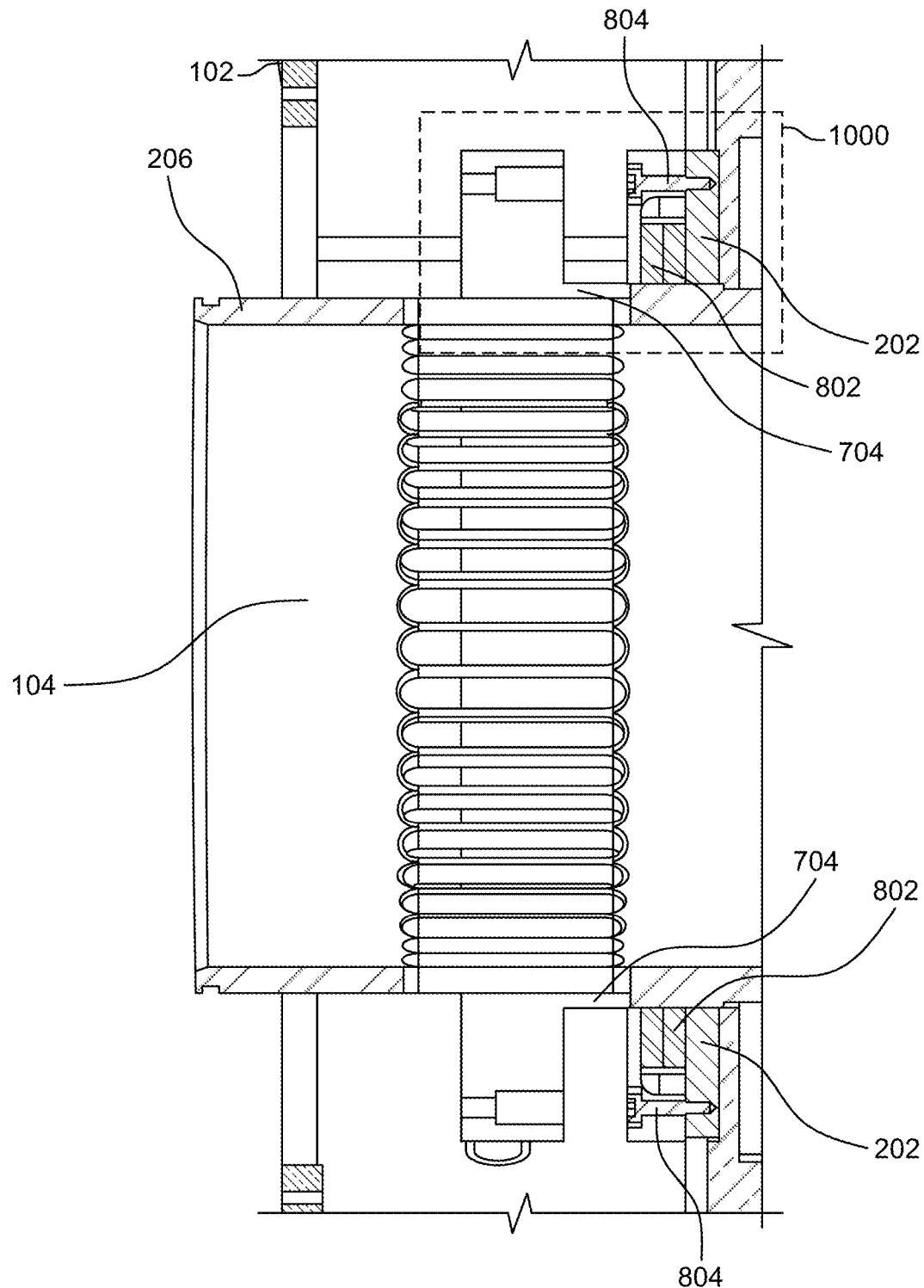
FIG. 9 shows an exemplary seal assembly after deployment as fastened into place against an inboard flange of an exemplary manifold assembly, in accordance with some embodiments of the present disclosure.

FIG. 9 shows seal deployment 900, wherein seal assembly 802 is depicted in an installation position after deployment (e.g., after using installation tool 700 of FIG. 7). Seal assembly 802 is fastened into place against inboard flange 202 of manifold assembly 102. The manifold assembly (e.g., manifold assembly 102 of FIG. 1) comprises inboard flange 202 such that inboard flange 202 closely encircles cylinder 104 but does not make contact with cylinder 104. Flange 202 may be an integral part of the manifold assembly or it may be a discrete component that is attached to the manifold assembly by any suitable attachment method such as bolting, welding, or riveting.

Since the manifold assembly and cylinder 104 generally have different structural characteristics (static and dynamic stiffness) and different thermal and structural loads, they may need to be mechanically uncoupled so that they are vibrationally isolated and isolated to thermal expansion effects. This isolation allows cylinder 104 to remain aligned and true to meet the tight tolerances required for efficient operation and permissible ring wear rates during its lifecycle. To accomplish uncoupling or isolation, the manifold assembly and cylinder 104 may be mounted independently to different structural chassis' (frames) or mounted to the same chassis (frame) in different locations to allow some relative movement between them at the area where they interface, for example, at flange 202. As a result, the manifold assembly and cylinder 104 may not be in direct contact. In some embodiments, there is a gap (e.g., gap 204 of FIG. 2) between outer surface 206 of cylinder 104 and the manifold.

In some embodiments, seal assembly 802 may include a tension band (e.g., tension band 312 of FIG. 3) around the outer periphery of a pair of sealing rings to bias them radially inward installed between retaining ring 302 and the pair of sealing rings. The tension band may be shorter in length than the circumference of the pair of sealing rings so that a tension spring (e.g., tension spring 314 of FIG. 3) can be connected between the ends of the tension band to provide a circumferential (azimuthal) force that preloads the pair of pair of sealing rings radially inward. The tension band may be made of a thin strip of metal that is relatively stiff and essentially inextensible under tension while having negligible bending stiffness so that it acts predominantly in tension. The tension of the tension band may controlled by a tension spring, such that a stiffer tension spring increases the force that the sealing rings exert on cylinder 104. The tension band also seals against any radial gaps formed at the interface between the sealing rings, as shown in FIG. 3.

One skilled in the art would recognize that there are many devices that can provide an inward radial force to the ring segment assembly, such as having an elastic band, radial springs, cantilever springs, or wave spring disposed at the outer radius of the sealing rings. These and other approaches are within the scope of this disclosure. Likewise, there are other types of springs that may be applied to a tension band to provide tension. In some embodiments, the tension spring may be a coil spring, as shown in FIG. 3. As such, the seal ring adjacent to tension spring may have a recess to accommodate the tension spring so that it is low in profile for packaging and so that it transmits a force that is in line with the tension band.

Installation assembly 800 of FIG. 8 (incorporating installation tool 700 of FIG. 7) may be used to pilot sealing ring assembly 802 onto a power cylinder (e.g., cylinder 104); it is shown in final installation in the positioned depicted in FIG. 9. Sealing ring assembly 802 fits over the cylinder, and it is installed through a deep cavity (the manifold) to where it resides on the power cylinder. Therefore, a tool may be used to aid in installing the sealing ring assembly. The installation tool may include at least large holes for pushing the sealing ring assembly off the installation tool and onto the power cylinder. The installation tool may have a flange that holds seal assembly 802 and serves as a surrogate cylinder surface until seal assembly 802 is pushed off the installation tool and into place on the power cylinder (e.g., for lateral alignment during installation on cylinder 104). A leading edge of the radial flange (e.g., edge 704 of FIG. 7) may contact a lip on cylinder 104 to stop the installation tool at an axial location so that seal assembly 802 can be unloaded into an installation position.

FIG. 10 is portion 1000 of seal deployment 900 of FIG. 9, showing seal assembly 802 mounted into place. Flange 702 of installation tool 700 butts up against step 1002 in outer surface 206 of cylinder 104 to axially locate installation tool 700 so that seal assembly 802 can be deployed into place onto outer surface 206 of cylinder 104. Sealing rings 304 and 308 are captured between the retaining ring 302 inboard flange 202 of the manifold such that sealing rings 304 and 308 have a slip condition allowing them to move radially to accommodate deformation of cylinder 104. Ring pocket 404 is sized, as described above in this disclosure, to accommodate the seals. Tension band 312 provides a radial preload to keep sealing rings 304 and 308 in contact with outer surface 206 of cylinder 104. Hence, sealing against outer surface 206 of cylinder 104 is provided by the first and second seals as formed by rings 304 and 308 when in contact with outer surface 206. This is because, in some embodiments, both inner radius 1004 of retaining ring 302 and inner radius 1006 of inboard flange 202 do not contact outer surface 206 of cylinder 104 to reduce transmission of mechanical forces between cylinder 104 and manifold assembly 102.

In an illustrative example, there may be an exhaust gas leak path that propagates from the inside of manifold assembly 102, past inner radius 1004 of retaining ring 302, over the top of tension band 312, and under inner radius 1006 of inboard flange 202 (i.e., between inboard flange 202 and the outer surface 206 of cylinder 104). The resistance to leaking is proportional to the length and width of the leak paths. While some leakage may be acceptable, the resistance to leaking can be minimized by providing a close tolerance between retaining ring 302 (i.e., ring pocket 404 size) and the width of sealing rings 304 and 308; the design trade-off is to permit sealing rings to move radially a small amount to accommodate thermal expansion as described above while minimizing gaps. The preload provided by tension band 312 may overcome any friction or stiction between sealing rings 304 and 308 and their axial abutments—retaining ring 302 and inboard flange 202. Furthermore, increasing height 1008 of sealing rings 304 and 308 can reduce the amount of leakage because the gas must travel through a small gap having a relatively long length to escape from the manifold. In some embodiments, the sealing rings may be forced against the inboard flange or the retaining ring to maintain contact to block the axial leak path. For example, a spring may be placed between a sealing ring and the adjacent wall (e.g., the retaining ring or "housing") to preload the sealing ring assembly against the opposite wall (e.g., the inboard flange). The spring may comprise a wave spring or one or more coil springs, for example, or any other spring that fits within the geometry and applies an axial force to the sealing rings. Even with an axial spring, as mentioned above, the preload force provided by the tension band should overcome any friction or stiction between the sealing rings and their axial abutments—the retaining ring and the inboard flange.

While the sealing ring embodiments disclosed above have been described with respect to a sealing ring embodiment having two opposing segments, there are many other sealing ring configurations that are within the scope of this disclosure. For example, the sealing ring assembly may include more than two segments; for example, it may have three, four, or more than four segments, with each adjacent segment having an overlap feature to accommodate dimensional changes due to thermal expansion and ring wear.

Figure 11:
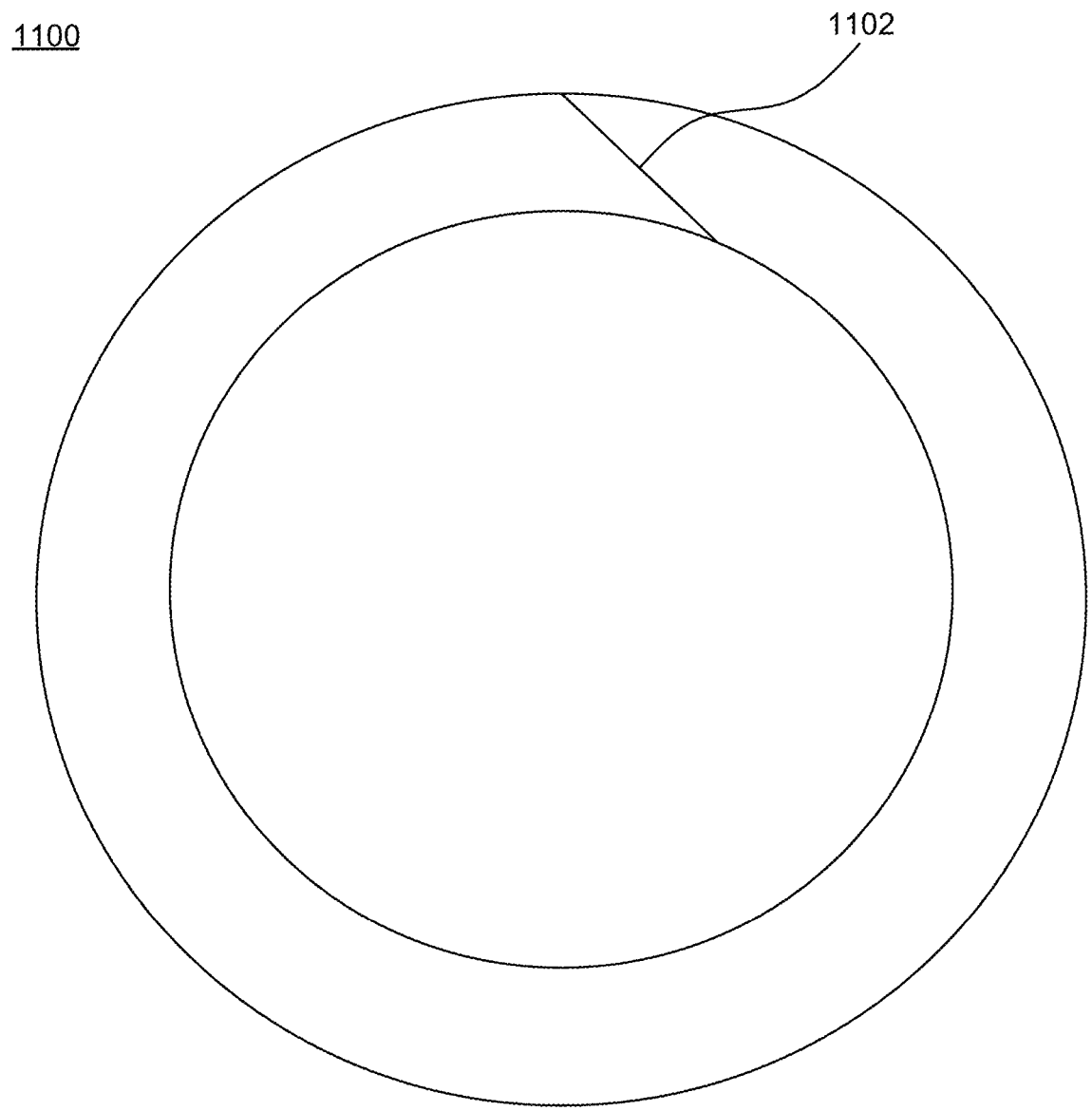
FIG. 11 illustrates an exemplary sealing ring assembly having a single sealing ring, in accordance with some embodiments of the present disclosure.

FIG. 11 depicts single sealing ring 1100, which may be used in place of or in combination with either or both of sealing rings 304 and 308 corresponding to sealing ring assembly 802 (e.g., as shown in any of FIGS. 1-9). The single sealing ring 1100 may have an angled interface 1102, where its ends meet to take up excess radial size due to wear or cylinder deformation. Additionally, or alternatively, the single sealing ring 1100 may also have interlocking recesses at the ends (not shown) similar to the dual ring embodiment disclosed herein to prevent a direct axial leak path. Furthermore, the single sealing ring 1100 may be used in a similar assembly as disclosed herein, having a tension band on its outer radius to provide a radial preload against the outer surface of the power cylinder.

In other embodiments, the sealing ring may have a metal layer causing an inwardly radial bias that forces the sealing ring against the cylinder. For example, the metal layer may have a higher coefficient of thermal expansion (CTE) than the seal, and it may be fitted onto the seal during manufacturing at an elevated temperature that is greater than the operating temperature. At operating temperature, the metal layer tends to contract more than the seal, causing an inward radial force on the seal. The metal layer may be bonded or otherwise fitted to the outer diameter or side of the seal.

While the sealing ring embodiments described herein have been described in the context of sealing an exhaust system relative to a power cylinder, the inventions and concepts disclosed herein may apply to any junction between two structures where some level of sealing is required while maintaining structural isolation. Examples of junctions include the connection between an intake manifold and a power cylinder or any other port, plenum, or conduit that connects to a power cylinder, driver system (e.g., gas spring), linear generator, or a combination thereof.

Figure 12:
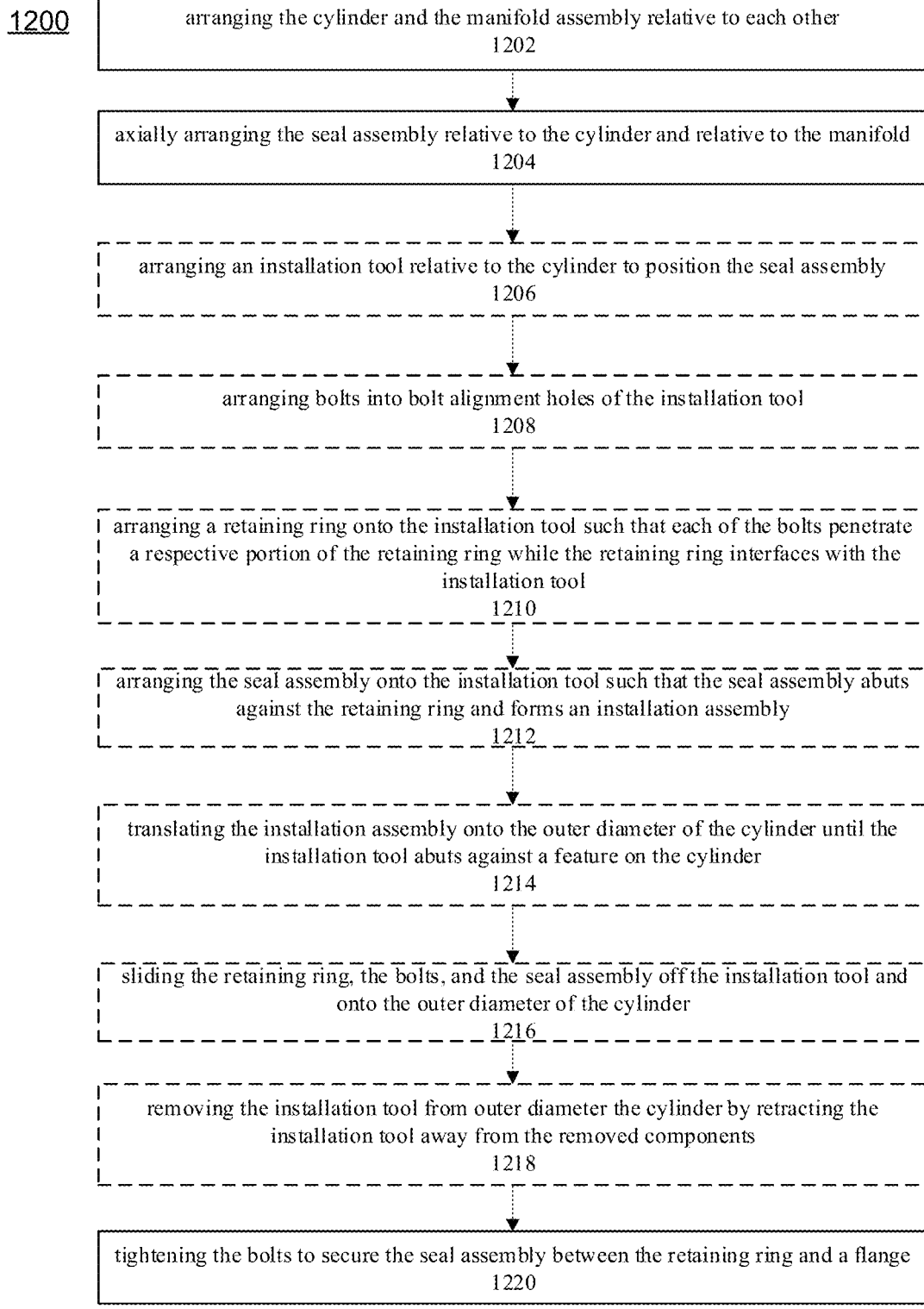
FIG. 12 is a flow chart representing an exemplary method for installing a seal between for sealing between a cylinder and a manifold assembly, in accordance with some embodiments of the present disclosure.

FIG. 12 is a flow chart representing an exemplary method for installing a seal for sealing between a cylinder and a manifold assembly, in accordance with some embodiments of the present disclosure. At 1202, a cylinder (e.g., cylinder 104 of FIG. 1) and a manifold assembly (e.g., manifold 102 of FIG. 1) are arranged relative to each other (e.g., as depicted in FIG. 1). At 1204, a seal assembly (e.g., seal assembly 802 of FIG. 8) is arranged relative to the cylinder and relative to the manifold. At 1206, an installation tool is arranged relative to the cylinder to position the seal assembly (e.g., installation tool 700 of FIG. 7 and/or installation tool 800 of FIG. 8). At 1208, bolts (e.g., bolts 804) are arranged into the bolt alignment holes of the installation tool. At 1210, a retaining ring (e.g., retaining ring 302) is arranged onto the installation tool such that each of the bolts penetrate a respective portion of the retaining ring while the retaining ring interfaces with the installation tool. At 1212, the seal assembly is arranged onto the installation tool such that the seal assembly abuts against the retaining ring and forms an installation assembly. At 1214, the installation assembly is translated onto the outer diameter of the cylinder until the installation tool abuts against a feature (e.g., a step, an edge, or a lip) on the cylinder. At 1216, the retaining ring along with the bolts and the seal assembly are slid off the installation tool and onto the outer diameter of the cylinder. At 1218, the installation tool is removed (e.g., as shown in FIG. 9) from the outer diameter of the cylinder by retracting the installation tool away from the removed components (e.g., the retaining ring, the bolts, and the seal assembly). At 1220, the bolts are tightened to secure the seal assembly between the retaining ring and a flange (e.g., flange 202).

Figure 13:
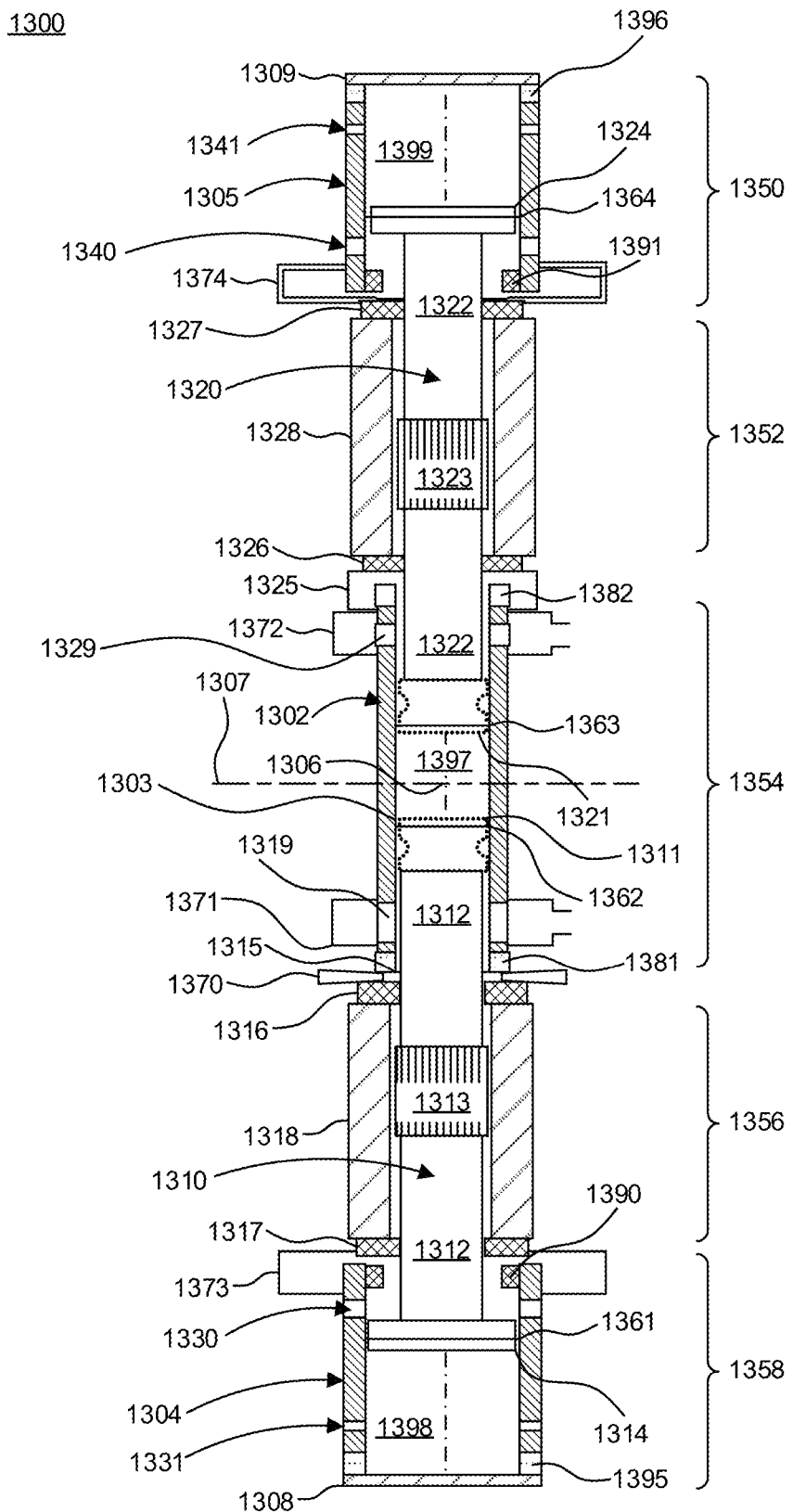
FIG. 13 shows a cross-sectional side view of an illustrative generator assembly, in accordance with some embodiments of the present disclosure.

FIG. 13 shows a cross-sectional view of illustrative generator assembly 1300, in accordance with some embodiments of the present disclosure. Generator assembly 1300 is configured as an opposed, free-piston generator. Generator assembly 1300 includes translators 1310 and 1320, which are configured to move along axis 1306 (e.g., translate linearly along axis 1306). Translators 1310 and 1320 are configured to move within cylinders 1302, 1304 and 1305, thus forming expansion and compression volumes 1397, 1398, and 1399 for performing boundary work (e.g., determined using the cyclic integral of PdV over a suitable range such as a stroke or cycle). For clarity, the spatial arrangement of the systems and assemblies described herein will generally be referred to in the context of cylindrical coordinates, having axial, radial, and azimuthal directions. It will be understood that any suitable coordinate system may be used (e.g., cylindrical coordinates may be mapped to any suitable coordinate system), in accordance with the present disclosure. Note that axis 1306 is directed in the axial direction, and the radial direction is defined as being perpendicular to axis 1306 (e.g., directed away from axis 1306). The azimuthal direction is defined as the angular direction around axis 1306 (e.g., orthogonal to both axis 1306 and the radial direction, and directed around axis 1306).

In some embodiments, the stationary components of generator assembly 1300 include cylinder 1302, cylinder 1304, cylinder 1305, stator 1318, stator 1328, bearing housing 1316, bearing housing 1317, bearing housing 1326, bearing housing 1327, seal 1315, seal 1325, manifold 1371 (e.g., a manifold comprising any or all of the elements or assembled using any or all of the elements of FIGS. 1-11), and intake manifold 1372. In some embodiments, bearing housings 1316 and 1317 are coupled to stator 1318 (e.g., either directly connected, or coupled by an intermediate component such as a flexure or mount). For example, bearing housings 1316 and 1317 may be aligned to (e.g., laterally or axially aligned), and fastened to, stator 1318 to maintain a radial air gap between magnet assembly 1313 and stator 1318. Similarly, in some embodiments, bearing housings 1326 and 1327 are rigidly coupled to stator 1328.

Translator 1310 includes tube 1312, piston 1311, seal 1362, piston 1314, seal 1361, and magnet assembly 1313, all substantially rigidly coupled to move as a substantially rigid body along axis 1306, relative to the stationary components. Translator 1320 includes tube 1322, piston 1321, seal 1363, piston 1324, seal 1364, and magnet assembly 1323, all substantially rigidly coupled to move as a substantially rigid body along axis 1306. In some embodiments, pistons 1311 and 1321 may include features or components to manage, modify, reduce, or otherwise control thermal expansion of or heat transfer to tubes 1312 and 1322, respectively (e.g., a spacer with low thermal conductivity, a collar that affects the flow of blow-by gases, or both) In some embodiments, magnet assemblies 1313 and 1323 may be a region of tubes 1312 and 1322, respectively. In some embodiments, magnet assemblies 1313 and 1323 may include separate components affixed to tubes 1312 and 1322, respectively.

Reaction section 1397 is bounded by pistons 1311 and 1321 (e.g., and also defined by seals 1362 and 1363), as well as bore 1303 of cylinder 1302. Gas springs 1398 and 1399 are bounded by respective pistons 1314 and 1324, as well as respective cylinders 1304 and 1305. Accordingly, as translators 1310 and 1320 move along axis 1306, the volumes of reaction section 1397, gas spring 1398, and gas spring 1399 expand and contract. Further, for example, pressures within those volumes decrease or increase as the volume increases or decreases, respectively. Each of bearing housings 1316, 1317, 1326, and 1327 is configured to provide a gas bearing between itself and the corresponding translator (e.g., tube 1312 and 1322). For example, each of bearing housings 1316, 1317, 1326, and 1327 may be configured to direct pressurized gas to the gas bearing (e.g., via a flow system). In an illustrative example, each of bearing housings 1316, 1317, 1326, and 1327 may be configured to direct pressurized gas having an absolute pressure greater than ambient pressure (e.g., 1 atm at sea level) to the gas bearing such that bearing gas has sufficient pressure to flow through the gas bearing and into the environment (e.g., directly or via other ducting).

In some embodiments, bearing gas may be pressurized relative to the environment (e.g., about 1 atm), a pressure in a breathing system (e.g., a boost pressure, or a gas pressure in an exhaust system that may be greater than or less than 1 atm), or any other suitable pressure reference. In some embodiments, generator assembly 1300 is configured for oil-less operation, with bearing housings 1316, 1317, 1326, and 1327 forming gas bearings against translators 1310 and 1320. Each of translators 1310 and 1320 is configured achieve a position-velocity trajectory. The trajectory may include a top dead center (TDC) position, when the respective translator is nearest axial centerline 1307 (i.e., more inboard), and a bottom dead center (BDC) position, where the respective translator is furthest from axial centerline 1307 (i.e., more outboard).

Cylinder 1302 includes bore 1303, which houses reaction section 1397. Cylinder 1302 also includes illustrative intake breathing ports 1319 and exhaust breathing ports 1329, which couple bore 1303 to the outside of cylinder 1302. For example, intake breathing ports 1329 couple bore 1303 to an intake system, such as intake manifold 1372 thereof. In a further example, exhaust breathing ports 1319 couple bore 1303 to an exhaust system, such as manifold 1371 thereof. Intake manifold 1372 may seal to cylinder 1302, seal 1325 (e.g., by extending axially to seal 1325), bearing housing 1326 (e.g., by extending axially to bearing housing 1326, an intervening component, or a combination thereof. Manifold 1371 may seal to cylinder 1302, seal 1315, bearing housing 1316 (e.g., by extending axially to bearing housing 1316, an intervening component, or a combination thereof).

In some embodiments, as illustrated, seal 1315 includes a contact seal, which may be comprised of a self-lubricating material (e.g., graphite), ceramic material, metal, plastic, or any other suitable material, or any combination thereof. Seal 1315 is stationary with respect to the motion of translator 1310 and can be housed within a ring compressor 1381 (as illustrated), cylinder 1302, a dedicated seal holder, or any other suitable component, or any combination thereof. In some embodiments, seal 1315 includes a contact seal, non-contact seal, any other suitable seal, or any combination thereof. In some embodiments, as illustrated, a translator cooler 1370 may be included to provide a flow of pressurized gas used to cool translator 1310. In some embodiments, cooling gas for translator cooler 1370 may be provided by a blower (e.g., of an intake system), reservoir of a gas spring system, a port of a gas spring system, an external gas supply, any other suitable gas supply, or any combination thereof. In some embodiments, translator cooler 1370 may be configured to provide preferential cooling fluid flow. For example, translator cooler 1370 may provide more cooling fluid flow to one or more surface areas of translator 1310 and less cooling flow to the one or more other surface areas of translator 1310, or vice versa. In some embodiments, translator cooler 1370 may be configured to provide substantially uniform cooling.

When intake breathing ports 1329 are not covered by piston 1321 (e.g., intake ports are open), fluid exchange between reaction section 1397 and the intake system may occur. When exhaust breathing ports 1319 are not covered by piston 1311, fluid exchange between reaction section 1397 and the exhaust system may occur. Fluid flow primarily occurs from the intake system through intake breathing ports 1329 to bore 1303, and from bore 1303 through exhaust breathing ports 1319 to the exhaust system. For example, averaged over time, fluid flows from the intake system to bore 1303, and from bore 1303 to the exhaust system. However, flow may also occur in the opposite directions such as, for example, from blowback or plugging pulses, during some time periods (e.g., intermittent or transient events). In some embodiments, the radially outer surface of cylinder 1302 is cooled. For example, the radially outer surface of cylinder 1302 may be air-cooled (e.g., by a cooling system), liquid-cooled (e.g., by a cooling system), or both. In some embodiments, a thermal interface material may be arranged between the air cooling features (such as fins) and cylinder 1302 to improve thermal conductivity. In some embodiments, cylinder 1302 may include one or more ports arranged in between intake breathing ports 1329 and exhaust breathing ports 1319, which may be configured to house sensors (e.g., coupled to a control system), fuel injectors (e.g., coupled to an intake system or dedicated fuel system), or any other suitable components that may require access to bore 1303.

Along axis 1306, intake breathing ports 1329 and exhaust breathing ports 1319 may be, but need not be, positioned symmetrically about a center of cylinder 1302. Port location can be referenced to any suitable datum; however, one datum is the position of the front of the port (e.g., nearest axial centerline 1307). The front of the ports defines the closed portion of the cycle (e.g., the start of compression, the end of expansion, the start of breathing, the end of breathing). For example, in some embodiments, exhaust breathing ports 1319 may be relatively closer to axial centerline 1307 than intake breathing ports 1329. To illustrate, exhaust breathing ports 1319 may open to reaction section 1397 before intake breathing ports 1329 during an expansion stroke, and exhaust breathing ports 1319 may close to reaction section 1397 after intake breathing ports 1329 during a compression stroke.

In some embodiments, breathing techniques other than uniflow scavenging may be used, such as, for example, loop scavenging or cross scavenging, and accordingly breathing ports may be positioned to be uncovered by only a single piston (e.g., with intake and exhaust breathing ports on the same side axially of the cylinder). In some embodiments, the centerline of piston positions may be changed during operation to change the relative timing of port openings and closings. For example, while the port locations may be spatially fixed on cylinder 1302, the apex positions of pistons 1311 and 1321 (e.g., TDC position and BDC position) may be selected to move the TDC centerline (e.g., the midpoint between TDC positions of pistons 1311 and 1321 in either axial direction). In a further example, moving the TDC centerline may allow breathing behavior to be changed. The timing of port opening and closing, relative strength (e.g., amplitude in pressure wave), or both, of breathing behavior may be changed accordingly. Further, the compression ratio, expansion ratio, or both, may be changed by moving the TDC centerline or the BDC positions. To illustrate, the TDC centerline may, but need not, coincide axially with axial centerline 1307. Breathing port locations and piston apex positions may be used to affect breathing behavior.

In some embodiments, the BDC position of one or both pistons may be changed during operation to change the relative timing of port openings and closings. For example, one port may be maintained open longer to impact breathing. It will be understood that TDC and BDC refer to respective positions of pistons in contact with a reaction section (e.g., which correspond to BDC an TDC of pistons in contact with gas springs, respectively). For example, at or near TDC, a reaction section has a minimum volume and a gas spring has a maximum volume. In a further example at or near BDC, a reaction section has a maximum volume and a gas spring has a minimum volume. In some embodiments, a cylinder assembly comprises cylinder 1302, intake manifold 1372, manifold 1371, mounting hardware (e.g., mounts, flexures, or other hardware), and any other suitable components that may be mounted as a unit. Ring compressors 1381 and 1382 are coupled to the axial ends of cylinder 1302 for the purposes of maintaining seals 1362 and 1363, respectively, within pistons 1311 and 1321, respectively, during replacement, installation, removal, or inspection.

For example, during inspection or maintenance, translators 1310 and 1320 may be positioned axially so that ring compressors 1381 and 1382 are axially aligned with respective seals 1362 and 1363. Further, ring compressors 1381 and 1382 may be removed with respective pistons 1311 and 1321 during maintenance or inspection. Ring compressors 1381 and 1382 may have the same or similar inner diameter as bore 1303 of cylinder 1302. In some embodiments, ring compressors 1381 and 1382 may comprise of two or more sections (e.g., a clamshell design) configured to hold seals 1362 and 1363 in place during replacement, installation, removal, or inspection. In some embodiments, ring compressors 1381 and 1382 may comprise a single piece configured to hold seals 1362 and 1363 during replacement, installation, removal, or inspection. Ring compressors 1381 and 1382 may be attached to cylinder 1302 through any suitable means, including but not limited to, v-band clamps, fasteners, bolts, springs, or any combination thereof.

In some embodiments, as illustrated, cylinders 1304 and 1305 are closed by respective heads 1308 and 1309, which may be bolted or otherwise fastened to cylinders 1304 and 1305 (e.g., to suitable flanges of cylinders 1304 and 1305). In some embodiments, cylinders 1304 and 1305 include a closed end (e.g., to seal gas springs 1398 and 1399, respectively), and no separate head need be included. In some embodiments, as illustrated, spacers 1395 and 1396 are arranged to provide axial space, and hence volume, to respective gas springs 1398 and 1399. Spacers 1395 and 1396 may be bolted, fastened, or otherwise secured to respective cylinders 1304 and 1305, respective heads 1308 and 1309, or both. In some embodiments, spacers 1395 and 1396 are configured to function as ring compressors (e.g., during disassembly, inspection or replacement of rings). In some embodiments, spacers 1395 and 1396 may comprise two or more sections (e.g. a clamshell design).

Cylinders 1304 and 1305 include respective lower-pressure ports 1330 and 1340 for exchanging lower pressure gas (e.g., for exchanging lower pressure gas) and respective higher-pressure ports 1331 and 1341 for exchanging higher pressure gas (e.g., for exchanging higher pressure gas). In some embodiments, lower-pressure ports 1330 and 1340 are coupled to the environment, with the corresponding gas flow referred to herein as "atmospheric breathing." In some embodiments, lower-pressure ports 1330 and 1340 are coupled to a low-pressure reservoir or source (e.g., conditioned atmospheric air or other suitable gas reservoir or source above atmospheric pressure). For example, lower-pressure ports 1330 and 1340 may be coupled to respective reservoirs 1373 and 1374, as illustrated. Reservoirs 1373 and 1374 may be configured to seal back sections of pistons 1314 and 1324, respectively. As illustrated, reservoirs 1373 and 1374 are sealed against bearing housings 1317 and 1327, respectively, and also cylinders 1304 and 1305, respectively. Reservoirs 1373 and 1374 may be sealed against any suitable component of a linear generator including, for example, a frame, a stator, a gas spring head, any other suitable component, or any combination thereof. The volume of reservoirs 1373 and 1374 may be sized to minimize or otherwise limit pressure fluctuations in gas in the respective back sections.

In some embodiments, a filter may be installed at, or upstream of, lower-pressure ports 1330 and 1340 to prevent the intake of particles (e.g., dust or debris), certain molecules (e.g., water in some instances), or other undesirable constituents of the gas source. In some embodiments, cylinders 1304 and 1305 need not include lower-pressure ports 1330 and 1340, higher-pressure ports 1331 and 1341, or any ports at all. For example, in some embodiments, no high-pressure ports are included, and low-pressure ports 1330 and 1340 are included to provide make-up gas to make up for blow-by past respective pistons 1314 and 1324 (e.g., and may be included at any suitable location in the corresponding cylinder or cylinder head if applicable). In some embodiments, driver sections 1350 and 1358 may include features for removing energy from the generator system to protect against damage or failures (e.g., overpressure of gas spring 1398 or 1399, loss of sealing of gas spring 1398 or 1399). For example, either or both of cylinders 1304 and 1305 may include grooves (e.g., "scallops") configured to allow higher-pressure gas to leak around the seals (e.g., rings) if pistons 1314 and 1324 overtravel, thus causing the gas spring to lose pressure and energy. In a further example, a pressure relief valve may be included and coupled to the gas spring to cause the gas spring to release energy (e.g., gas) if the pressure exceeds a design threshold.

Stator 1318, magnet assembly 1313, tube 1312, and bearing housings 1316 and 1317 form linear electromagnetic generator (LGEN) 1356. Similarly, stator 1328, magnet assembly 1323, tube 1322, and bearing housings 1326 and 1328 form LGEN 1352. Further, a LGEN may optionally include one or more pistons. For example, a LGEN may be defined to include stator 1318, translator 1310, and bearing housings 1316 and 1317. In a further example, a LGEN may be defined to include stator 1328, translator 1320, and bearing housings 1326 and 1327. A LGEN includes a stationary assembly (e.g., a stator and bearing housings) and a translating assembly (e.g., a translator) that is constrained to move along an axis, wherein the stator is capable of applying an electromagnetic force on the translator to cause and/or effect motion along the axis. The bearing housings of a LGEN may be, but need not be, affixed to the stator. For example, the bearings housings may be coupled to the stator, a structural frame, a cylinder, either directly or by intervening components, or any combination thereof. Stators 1318 and 1328 may include a plurality of phase windings, which form a plurality of phases.

The current in each of the phases may be controlled in time by a control system (e.g., which may include corresponding power electronics and processing equipment) to affect the position of translators 1310 and 1320, motion of translators 1310 and 1320, work interactions with translators 1310 and 1320, or any combination thereof. In some embodiments, magnet assemblies 1313 and 1323 include permanent magnets arranged in an array (e.g., of alternating North and South poles). Because translators 1310 and 1320 move as substantially rigid assemblies, electromagnetic forces applied to respective magnet assemblies 1313 and 1323 accelerate and decelerate translators 1310 and 1320. In some embodiments, stators 1318 and 1328 may be air-cooled (e.g., by an air-cooling system), liquid-cooled (e.g., by a liquid cooling system), or both. In some embodiments, stators 1318 and 1328 are arranged around respective translators 1310 and 1320, or respective magnet assemblies 1313 and 1323 thereof (e.g., the motor air gap is arcuate with a thickness profile). For example, stators 1318 and 1328 may extend fully around (e.g., 360 degrees azimuthally around) or partially around (e.g., having azimuthally arranged segments and azimuthally arranged gaps between windings of a phase) respective translators 1310 and 1320.

In some embodiments, stators 1318 and 1328 are arranged axially along respective translators 1310 and 1320, or respective magnet assemblies 1313 and 1323 thereof. For example, magnet assemblies 1313 and 1323 may include flat magnet sections and stators 1318 and 1328 may include flat surfaces that correspond to the magnet sections (e.g., the motor air gap is planar with a thickness profile). In some embodiments, stators 1318 and 1328 extend axially along respective translators 1310 and 1320, or respective magnet assemblies 1313 and 1323 thereof.

In some embodiments, generator assembly 1300 includes one or more features for protecting components of generator assembly 1300 from damage due to mechanical failures, control failures, component failures, operation at extreme conditions, or a combination thereof. Bump stops 1390 and 1391, as illustrated, are arranged to convert kinetic energy from respective translators 1310 and 1320 into deformation, by contacting respective pistons 1314 and 1324 in the event of an overtravel of the translators. For example, one or both of stators 1318 and 1328 may include one or more features for protecting generator assembly 1300. In some embodiments, one or both of stators 1318 and 1328 include one or more features (e.g., a bump stop, mechanical springs, pneumatic pistons) configured to convert translator kinetic energy into sound, heat, solid deformation, or a combination thereof, thus slowing, stopping, or redirecting the translator's motion. For example, a bump stop may be configured to undergo a plastic deformation (e.g., be bent, compacted, crumpled, punched or otherwise deformed) upon contact with a translator to convert kinetic energy of the translator. In some embodiments, one or more bump stops may be arranged at either or both of driver sections 1350 and 1358. In some embodiments, bump stops are included as part of other components of generator assembly 1300 such as, for example, driver sections 1350 and 1358. In some embodiments, bump stops are located at each end of cylinder 1302 near BDC. A bump stop may be affixed directly or with intervening components to a structural frame at any suitable location, affixed directly or with intervening components to a cylinder at any suitable location (e.g., cylinder 1303, 1304, 1305, or a combination thereof), affixed directly or with intervening components to a stator, or a combination thereof.

For ease of reference, the figures may show multiple components labeled with identical reference numerals. It will be understood that this does not necessarily indicate that the multiple components identically labeled are identical to one another. For example, manifold assembly 102 may have different sizes, geometries, materials, any other suitable characteristic, or any combination thereof.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston generators and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors and free-piston compressors. In some embodiments, the present disclosure is applicable to linear reciprocating devices with driver section (e.g., gas springs). In some embodiments, the present disclosure is applicable to oil-free reciprocating and free-piston generators and compressors. In some embodiments, the present disclosure is applicable to oil-free free-piston generators with internal or external combustion or reactions. In some embodiments, the present disclosure is applicable to oil-free free-piston generators that operate with compression ignition (e.g., homogeneous charge compression ignition (HCCI), stratified charge compression ignition (SCCI), or other compression ignition), spark ignition, or both. In some embodiments, the present disclosure is applicable to oil-free free-piston generators that operate with gaseous fuels, liquid fuels, or both. In some embodiments, the present disclosure is applicable to linear free-piston generators. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, assemblies, and apparatuses, but is intended to include variations to and modifications thereof.

What is claimed is:

1. A linear generator ("LGEN"), comprising:
   a cylinder configured to propagate an exhaust producing reaction, wherein the cylinder comprises at least one cylinder port; and
   a manifold assembly, wherein the manifold assembly is configured to interface with the at least one cylinder port, the manifold assembly comprising:
      a manifold configured to receive exhaust from the at least one cylinder port; and
      a sealing assembly comprising:
         a housing defining a circumferential recess,
         a seal arranged in the circumferential recess, and
         a spring element arranged within the circumferential recess, radially outward of the seal providing a radially inward force on the seal, wherein the spring element comprises two opposing ends coupled by a tension spring, and wherein the sealing assembly seals an interface between the manifold and the at least one cylinder port.

2. The LGEN of claim 1, wherein the seal comprises at least two sealing ring elements fixedly attached to at least one tension band, wherein the at least one tension band is arranged to prevent radial gaps from forming between the at least two sealing ring elements, and wherein at least one end of the at least one tension band is fixedly attached to the spring element.

3. A manifold assembly comprising:
   a manifold configured to receive exhaust from a cylinder port; and
   a sealing assembly comprising:
      a housing defining a circumferential recess,
      a seal arranged in the circumferential recess, and
      a spring element arranged within the circumferential recess, radially outward of the seal providing a radially inward force on the seal, wherein the spring element comprises two opposing ends coupled by a tension spring, and wherein the sealing assembly seals an interface between the manifold and the cylinder port.

4. The manifold assembly of claim 3, wherein the interface comprises a gapped interface.

5. The manifold assembly of claim 3, wherein the interface is further arranged around an outer surface of the cylinder.

6. The manifold assembly of claim 3, wherein the sealing assembly is configured to translate radially and independent of the interface.

7. The manifold assembly of claim 3, wherein the sealing assembly comprises at least one sealing ring element.

8. The manifold assembly of claim 7, wherein the interface further comprises a retaining ring.

9. The manifold assembly of claim 8, wherein the at least one sealing ring element is arranged such that an outer surface of the at least one sealing ring element abuts an inner surface of the retaining ring.

10. The manifold assembly of claim 7, wherein the at least one sealing ring element comprises at least two sealing ring elements fixedly attached to at least one tension band, wherein the at least one tension band is arranged to prevent radial gaps from forming between the at least two sealing ring elements.

11. The manifold assembly of claim 10, wherein at least one end of the at least one tension band is fixedly attached to the spring element.

12. The manifold assembly of claim 11, wherein the interface further comprises a retaining ring and wherein an outer surface of the at least two sealing ring elements abuts an inner surface of the retaining ring.

13. The manifold assembly of claim 12, wherein the spring element is accommodated by a portion of the at least two sealing ring elements.

14. A sealing assembly comprising:
   a housing defining a circumferential recess;
   a seal arranged in the circumferential recess; and
   a spring element arranged within the circumferential recess, radially outward of the seal providing a radially inward force on the seal, wherein the spring element comprises two opposing ends coupled by a tension spring.

15. The sealing assembly of claim 14, wherein the sealing assembly is configured to interface with a manifold.

16. The sealing assembly of claim 15, wherein a gap is between the housing and the manifold.

17. The sealing assembly of claim 14, wherein the seal comprises a graphite material.

18. The sealing assembly of claim 14, wherein the housing is affixed to a cylinder, wherein an outer surface of the cylinder interfaces with a manifold.

19. The sealing assembly of claim 14, wherein the seal comprises at least one respective tab on each respective end of the seal, wherein each of the at least one respective tabs comprises a fillet radius configured to strengthen a base of the at least one respective tabs.

20. The sealing assembly of claim 19, wherein the seal comprises a pair of sealing elements, wherein each of the pair of sealing elements interface with each other via the at least one respective tab when arranged within the circumferential recess.

* * * * *